Figure 1:
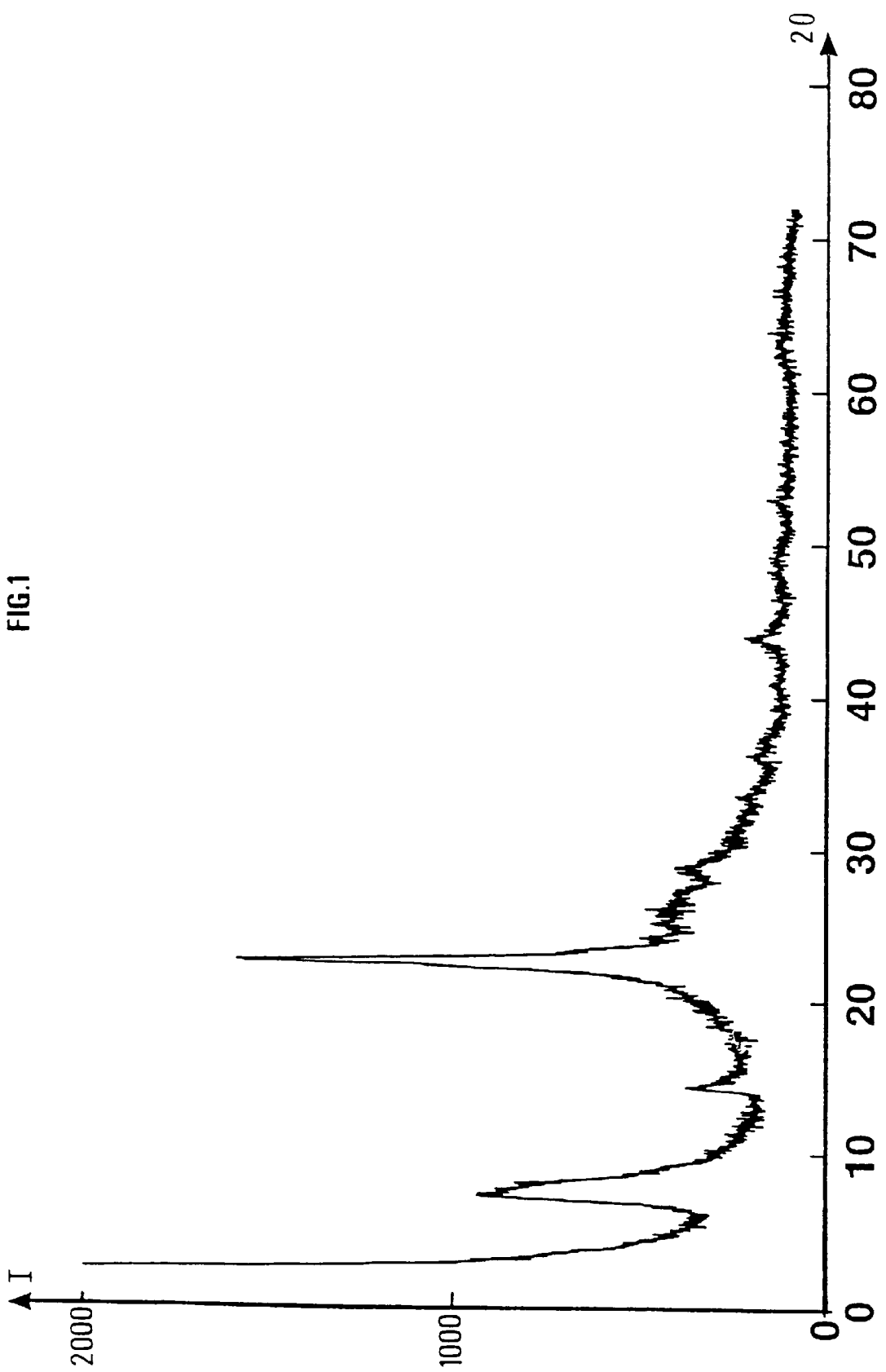

United States Patent [19]
Benazzi et al.

[11] Patent Number: 6,117,307
[45] Date of Patent: Sep. 12, 2000

[54] CATALYST COMPRISING A NU-88 ZEOLITE AND ITS USE FOR HYDROCONVERTING HYDROCARBON-CONTAINING PETROLEUM FEEDS

[75] Inventors: Eric Benazzi, Chatou; Nathalie George-Marchal, Saint Genis Laval; Slavik Kasztelan, Rueil Malmaison, all of France

[73] Assignee: Institut Francais du Petrole, Rueil-Malmaison Cedex, France

[21] Appl. No.: 09/253,012

[22] Filed: Feb. 19, 1999

[30] Foreign Application Priority Data

Feb. 20, 1998 [FR] France ................................. 98 02103

[51] Int. Cl.⁷ .................................................. C10G 47/16
[52] U.S. Cl. .................................. 208/111.3; 208/111.35; 502/64; 502/66; 502/74
[58] Field of Search ................................ 502/60, 64, 63, 502/74, 66; 585/419, 273, 481, 482, 467, 721, 520, 531, 653, 660, 739, 666; 208/122, 124, 111.3, 111.35

[56] References Cited

U.S. PATENT DOCUMENTS 4,557,919  12/1985  Sumitani et al. .
5,254,514  10/1993  Nakagawa .
5,641,393   6/1997  Nakagawa .

FOREIGN PATENT DOCUMENTS 825152  8/1997  European Pat. Off. .

*Primary Examiner*—Tom Dunn
*Attorney, Agent, or Firm*—Millen, White, Zelano & Branigan, P.C.

[57] ABSTRACT

An NU-88 zeolite and a hydrocracking catalyst comprising at least one matrix, a NU-88 zeolite, at least one group VIB or VII metal, a phosphorous, boron or silicon promoter, optionally at least one group VIIA element, and optionally at least one group VIIB element, and also the use of the catalyst for hydrocracking hydrocarbon feeds.

24 Claims, 2 Drawing Sheets

CATALYST COMPRISING A NU-88 ZEOLITE AND ITS USE FOR HYDROCONVERTING HYDROCARBON-CONTAINING PETROLEUM FEEDS

SUMMARY OF THE INVENTION

The present invention relates to a hydrocracking catalyst comprising at least one matrix, a NU-88 zeolite, at least one metal selected from the group formed by metals from group VIB and VIII of the periodic table, optionally at least one element selected from the group formed by phosphorous, boron and silicon, optionally at least one group VIIA element, and optionally at least one group VIIB element. The invention also relates to the use of the catalyst for hydrocracking hydrocarbon feeds.

Hydrocracking heavy petroleum feeds is a very important refining process which produces lighter fractions such as gasoline, jet fuel and light gas oil from surplus heavy feeds which are of low intrinsic value, which lighter fractions are needed by the refiner so that he can match production to demand. Certain hydrocracking processes can also produce a highly purified residue which can constitute excellent bases for oils. The importance of catalytic hydrocracking over catalytic cracking is that it can provide very good quality middle distillates, jet fuels and gas oils. The gasoline produced has a much lower octane number than that from catalytic cracking.

All catalysts used for hydrocracking are bifunctional, combining an acid function and a hydrogenating function. The acid function is supplied by large surface area supports (150 to 800 m²/g in general) with a superficial acidity, such as halogenated alumina (in particular fluorinated or chlorinated), combinations of boron and aluminium oxides, amorphous silica-alumina and zeolites. The hydrogenating function is supplied either by one or more metals from group VW of the periodic table, or by a combination of at least one metal from group VIB of the periodic table and at least one metal from group VIII.

The equilibrium between the two, acid and hydrogenating, functions is the fundamental parameter which governs the activity and selectivity of the catalyst. A weak acid function and a strong hydrogenating function produces low activity catalysts which generally operate at a high temperature (390° C. or above), and at a low supply space velocity (HSV, expressed as the volume of feed to be treated per unit volume of catalyst per hour, and is generally 2 h$^{-1}$ or less), but have very good selectivity for middle distillates. In contrast, a strong acid function and a weak hydrogenating function produces active catalysts but selectivities for middle distillates are poorer. The search for a suitable catalyst is thus centred on the proper choice of each of the functions to adjust the activity/selectivity balance of the catalyst.

One of the main points of hydrocracking is to exhibit high flexibility at various levels: flexibility in the catalysts used, which results in flexibility in the feeds to be treated and in the products obtained. One parameter which is easy to control is the acidity of the catalyst support.

The vast majority of conventional catalytic hydrocracking catalysts are constituted by weakly acidic supports such as amorphous silica-alumina. More particularly, such systems are used to produce very good quality middle distillates and, when their acidity is very low, oil bases.

Weakly acid supports include amorphous silica-alumina. Many catalysts on the hydrocracking market are based on silica-alumina combined either with a group VIII metal or, as is preferable when the amount of heteroatomic poisons in the feed to be treated exceeds 0.5% by weight, a combination of sulphides of groups VIB and VIII metals. The selectivity for middle distillates of such systems is very good, and the products formed are of high quality. The least acidic of such catalysts can also produce lubricating bases. The disadvantage of all such amorphous support-based catalytic systems is, as already stated, their low activity.

The catalytic activity of catalysts comprising Y zeolite with structure type FAU or beta type catalysts is higher than that of amorphous silica-alumina. but selectivities for light products are higher.

Research carried out by the Applicant on a number of zeolites and crystallised microporous solids have led to the discovery that, surprisingly, a catalyst containing at least one NU-88 zeolite can achieve a catalytic activity and selectivities for kerosine and gasoline which are substantially improved over prior art catalysts containing a zeolite.

More precisely, the invention provides a composition comprising at least one matrix and at least one element selected from the group formed by group VIII and group VIB elements, said catalyst being characterized in that it contains a NU-88 zeolite.

The NU-88 zeolite used in the present invention is characterized by:

i) a chemical composition with the following formula, expressed in terms of the mole ratios of the oxides for the anhydrous state:

$$100XO_2, mY_2O_3, pR_{2/n}O$$

where
m is 10 or less;
p is 20 or less;
R represents one or more cations with valency n;
X represents silicon and/or germanium, preferably silicon;
Y is selected from the group formed by the following elements: aluminium, iron, gallium, boron, titanium, vanadium, zirconium, molybdenum, arsenic, antimony, chromium and manganese, Y preferably being, aluminium, and ii) an X ray diffraction diagram, in its as synthesized state, which comprises the results shown in Table 1.

TABLE 1

X ray diffraction diagram for NU-88 zeolite (as synthesized state)

| $d_{hkl}$ (10$^{-10}$ m) | I/I$_{max}$ |
|---|---|
| 12.1 ± 0.35 | s or vs (1) |
| 11.0 ± 0.30 | s (1) |
| 9.88 ± 0.25 | m (1) |
| 6.17 ± 0.15 | w |
| 3.97 ± 0.09 | vs (2) |
| 3.90 ± 0.08 | vs (2) |
| 3.80 ± 0.08 | w (2) |
| 3.66 ± 0.07 | vw |
| 3.52 ± 0.07 | vw |
| 3.27 ± 0.07 | vw |
| 3.09 ± 0.06 | w |
| 2.91 ± 0.06 | w |
| 2.68 ± 0.06 | vw |
| 2.49 ± 0.05 | vw |

TABLE 1-continued

X ray diffraction diagram for NU-88 zeolite (as synthesized state)

| $d_{hkl}$ ($10^{-10}$ m) | $I/I_{max}$ |
|---|---|
| 2.20 ± 0.05 | vw |
| 2.059 ± 0.05 | w |
| 1.729 ± 0.04 | vw |

(1) these peaks were not resolved and formed part of a feature;
(2) these peaks were not resolved and formed part of the same feature.

The invention also concerns NU-88 in its hydrogen form, termed H-NU-88, produced by calcining and/or ion exchange as will be described below. H-NU-88 zeolite has an X ray diffraction diagram which comprises the results shown in Table 2.

TABLE 2

X ray diffraction diagram for NU-88 zeolite (hydrogen form)

| $d_{hkl}$ ($10^{-10}$m) | $I/I_{max}$ |
|---|---|
| 12.1 ± 0.35 | vs (1) |
| 11.0 ± 0.30 | s or vs (1) |
| 9.92 ± 0.25 | w or m (1) |
| 8.83 ± 0.20 | vw |
| 6.17 ± 0.15 | w |
| 3.99 ± 0.10 | s or vs (2) |
| 3.91 ± 0.08 | vs (2) |
| 3.79 ± 0.08 | w or m (2) |
| 3.67 ± 0.07 | vw |
| 3.52 ± 0.07 | vw |
| 3.09 ± 0.06 | w |
| 2.90 ± 0.06 | w |
| 2.48 ± 0.05 | w |
| 2.065 ± 0.05 | w |
| 1.885 ± 0.04 | vw |
| 1.733 ± 0.04 | vw |

(1) These peaks were not resolved and formed part of a feature.
(2) these peaks were not resolved and formed part of the same feature.

These diagrams were obtained using a diffractometer and a conventional powder method utilising the $K_\alpha$ line of copper, Cu K alpha. From the position of the diffraction peaks represented by the angle 2θ, the characteristic interplanar distances $d_{hkl}$ of the sample can be calculated using the Bragg equation. The intensity is calculated on the basis of a relative intensity scale attributing a value of 100 to the line representing the strongest peak on the X ray diffraction diagram, and then:

very weak (vw) means less than 10;
weak (w) means less than 20;
medium (m) means in the range 20 to 40;
strong (s) means in the range 40 to 60;
very strong (vs) means more than 60.

The X ray diffractograms from which the data are obtained (spacing d and relative intensities) are characterized by large reflections with a large number of peaks forming shoulders on other peaks of higher intensity. Some or all of the shoulders may not be resolved. This may be the case for samples with poor crystallinity or for samples with crystals which are small enough to produce significant broadening of the X rays. This can also be the case when the equipment or operating conditions used to produce the diagram differ from those used in the present case.

NU-88 zeolite is considered to have a novel basic structure or topology which is characterized by its X ray diffraction diagram. NU-88 zeolite in its "as synthesized state" has substantially the X ray diffraction characteristics shown in Table 1, and is thus distinguished from prior art zeolites. The invention also concerns any zeolite with the same structural type as that of NU-88 zeolite.

Figure 2:
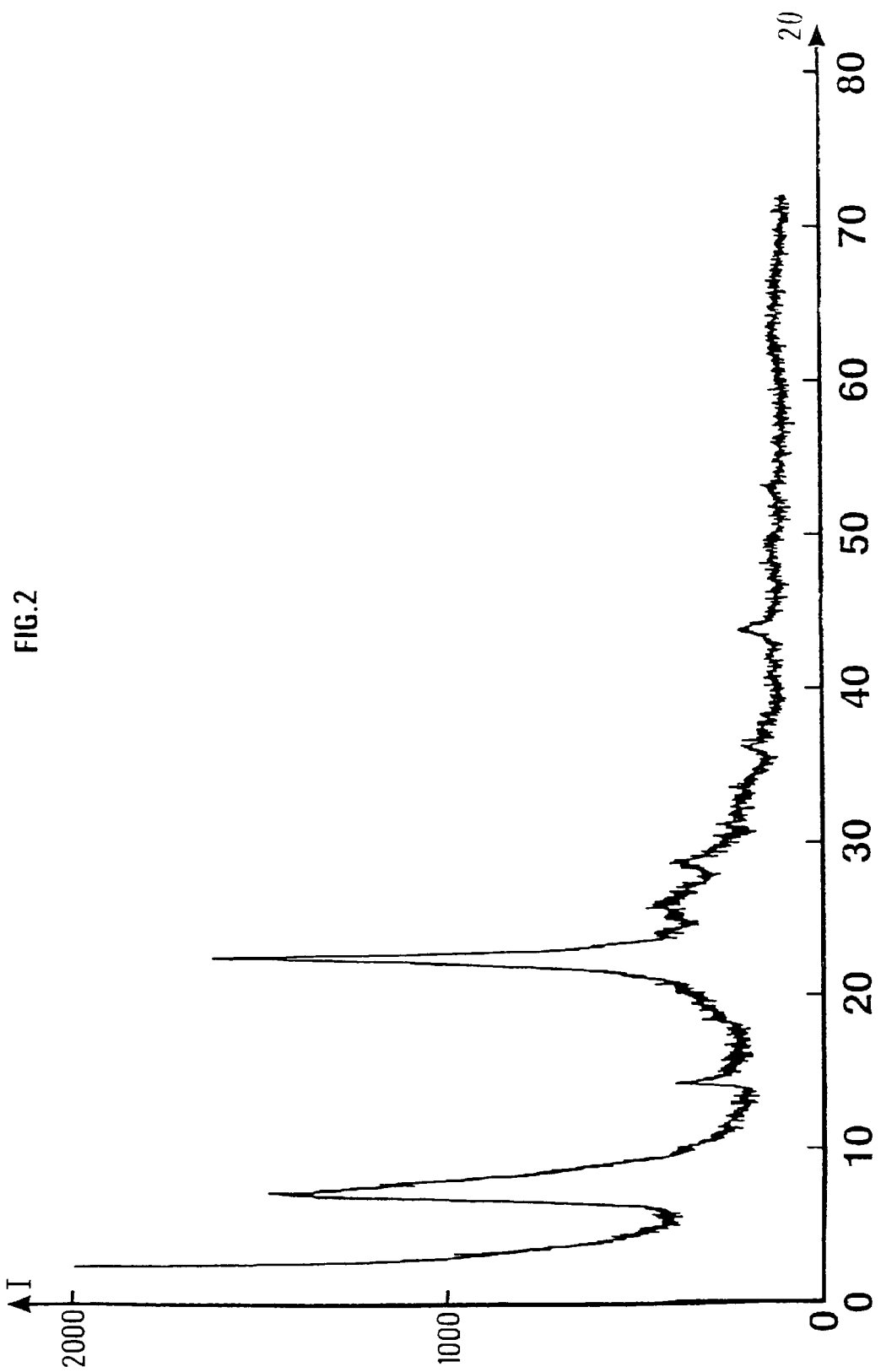

Tables 1 and 2 and the diffractograrms of FIGS. 1 and 2 are relatively unusual for zeolitic structures. Thus these data appear to indicate that NU-88 zeolite has a defective structure.

In the chemical composition defined above, m is generally in the range 0.1 to 10, preferably 0.2 to 9, and more preferably 0.6 to 8; it appears that NU-88 zeolite is generally and most readily obtained in a very pure form when m is in the range 0.6 to 8.

This definition also includes NU-88 zeolite in its "as synthesized state", as well as the forms obtained on dehydration and/or calcining and/or ion exchange. The term "in its as synthesized state" designates the product obtained by synthesis and washing, with or without drying or dehydration. In its "as synthesized state", NU-88 zeolite may contain a cation of metal M, which is an alkali, in particular sodium, and/or ammonium, and it may contain organic nitrogen-containing cations such as those described below or their decomposition products, or precursors thereof. These organic nitrogen-containing cations are designated here by the letter Q, which also includes decomposition products and precursors of the organic nitrogen-containing cations.

Thus NU-88 zeolite in its "as synthesized state" (not calcined) is characterized by:

i) a chemical composition with the following formula, expressed in terms of the mole ratios of the oxides for the anhydrous state:

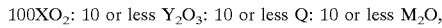

100$XO_2$: 10 or less $Y_2O_3$: 10 or less Q: 10 or less $M_2O$, where

X represents silicon and/or germanium;
Y is selected from the group formed by the following elements: aluminium, iron, gallium, boron, titanium, vanadium, zirconium, molybdenum, arsenic, antimony, chromium and manganese;
M is at least one alkali metal cation (group IA of the periodic table) and/or ammonium; and
Q is at least one organic nitrogen-containing cation or a precursor of an organic nitrogen-containing cation or a decomposition product of an organic nitrogen-containing cation;

ii) an X ray diffraction diagram, in its as synthesized state, which comprises the results shown in Table 1.

The compositions indicated above for NU-88 zeolite are given for the anhydrous state, since the NU-88 zeolite in its "as synthesized state" and activated forms of the NU-88 zeolite, i.e., resulting from calcining and/or ion exchange, may contain water. The mole ratio of $H_2O$ of such forms, including NU-88 zeolite in its "as synthesized state", depends on the conditions under which it is prepared and stored after synthesis or activation. The molar quantities of water contained in these forms are typically in the range 0 to 100% $XO_2$.

The calcined forms of NU-88 zeolite do not contain any organic nitrogen-containing compound, or contain a lesser quantity than the "as synthesized state", since the major portion of the organic substance has been eliminated, generally by heat treatment consisting of burning off the organic substance in the presence of air, the hydrogen ion ($H^+$) thus forming the other cation.

Thus the NU-88 zeolite in its hydrogen form is characterized by:

i) a chemical composition with the following formula, expressed in terms of the mole ratios of the oxides for the anhydrous state:

100XO$_2$: 10 or less Y$_2$O$_3$: 10 or less M$_2$O, where
X represents silicon and/or germanium;
Y is selected from the group formed by the following elements: aluminium, iron, gallium, boron, titanium, vanadium, zirconium, molybdenum, arsenic, antimony, chromium and manganese; and
M is at least one alkali metal cation (group IA of the periodic table) and/or ammonium; and/or hydrogen;

ii) an X ray diffraction diagram, in its as synthesized state, which comprises the results shown in Table 2.

Of the NU-88 zeolite forms which can be obtained by ion exchange, the ammonium form (NH$_4^+$) is important as it can readily be converted into the hydrogen form by calcining. The hydrogen form and forms containing metals introduced by ion exchange will be described below. In some cases, the fact that the zeolite of the invention is subjected to the action of an acid can give rise to partial or complete elimination of a base element such as aluminium, as well as generation of the hydrogen form. This may constitute a means of modifying the composition of the substance after it has been synthesized.

NU-88 zeolite in its hydrogen form (acid form), termed H-NU-88, produced by calcining and ion exchange as will be described below.

NU-88 zeolite which is at least partially in its H$^+$ form (as defined above) or in its NH$_4^+$ form or in its metal form, said metal being selected from the group formed by groups IA, IB, IIA, IIB, IIIA, IIIB (including the rare earths), VIII, Sn, Pb and Si, preferably at least partially in its H$^+$ form or at least partially in its metal form, can also be used. This type of zeolite generally has an X ray diffraction diagram which includes the results shown in Table 1.

Preferably, the NU-88 zeolite is at least partially in its acid form (and preferably completely in its H form) or partially exchanged with metal cations, for example alkaline-earth metal cations.

The NU-88 zeolites which form part of the composition of the invention are used with the silicon and aluminium contents obtained on synthesis.

The catalyst, characterized in that it comprises at least one NJ-88 zeolite, further comprises a hydrogenating function. The hydrogenating function per se, as defined above, comprises at least one metal selected from the group formed by metals from group VIB and VIII of the periodic table.

The catalyst of the present invention can comprise a group VIII element such as iron, cobalt, nickel, ruthenium, rhodium, palladium, osmium or platinum. Preferred group VIII metals are non noble metals such as iron, cobalt or nickel. The catalyst of the invention can comprise a group VIB element, preferably tungsten or molybdenum. Advantageously, the following combinations of metals are used: nickel-molybdenum, cobalt-molybdenum, iron-molybdenum, iron-tungsten, nickel-tungsten, cobalt-tungsten. Preferred combinations are: nickel-molybdenum, cobalt-molybdenum, nickel-tungsten. It is also possible to use combinations of three metals, for example nickel-cobalt-molybdenum.

The catalyst of the present invention also comprises at least one amorphous or low crystallinity oxide type porous mineral matrix. Non limiting examples are alumina, silicas and silica-alumina. Aluminates can also be used. Preferred matrices contain alumina, in any of the forms known to the skilled person, more preferably aluminas, for example gamma alumina.

In one implementation of the invention, the catalyst comprises at least one promoter element selected from the group formed by boron, silicon and phosphorous. The catalyst can optionally comprise at least one group VIIA element, preferably chlorine or fluorine, and optionally also at least one group VIIB element.

When the catalyst contains silicon, the silicon is introduced onto the support of the invention as a promoter. The silicon is principally located on the support matrix and can be characterized by techniques such as a Castaing microprobe (distribution profile of various elements), transmission electron microscopy coupled with X ray analysis of the catalyst components, or by producing a distribution map of the elements present in the catalyst using an electronic microprobe.

The catalyst of the present invention also comprises, in weight % with respect to the total catalyst weight:
0.1% to 60%, preferably 0.1% to 50%, more preferably 0.1% to 40%, of at least one metal selected from the group formed by group VIB and group VIII metals;
0.1% to 99%, preferably 1% to 98%, of at least one amorphous or low crystallinity oxide type porous mineral matrix;
said catalyst being characterized in that it comprises 0.1% to 99.8%, preferably 0.1 go to 90%, more preferably 0.1% to 80%, and particularly preferably 0.1% to 60%, of NU-88 zeolite;

said catalyst optionally comprising:
0 to 20%, preferably 0.1% to 15%, more preferably 0.1% to 10%, of at least one promoter element selected from the group formed by silicon, boron and phosphorous;
0 to 20%, preferably 0.1% to 15%, more preferably 0.1% to 10%, of at least one element selected from group VIIA, preferably fluorine;
0 to 20%, preferably 0.1% to 15%, more preferably 0.1% to 10%, of at least one element selected from group VIIB.

The group VIB, group VIII and group VIIB metals in the catalyst of the resent invention can be completely or partially present in the form of the metal and/or oxide and/or sulphide.

This catalyst can be prepared using any of the methods known to the skilled person. Advantageously, it is obtained by mixing the matrix and the zeolite then forming the mixture. The hydrogenating element is introduced during mixing, or, as is preferable, after forming. Forming is followed by calcining, the hydrogenating element being introduced before or after calcining. Preparation is completed by calcining at a temperature of 250° C. to 600° C. A preferred method consists of mixing the NU-88 zeolite powder in a moist alumina gel for a few tens of minutes, then passing the paste obtained through a die to form extrudates with a diameter in the range 0.4 to 4 mm.

The hydrogenating function can be introduced only partially (in the case, for example of combinations of oxides of groups VIB and VIII metals) or completely on mixing the zeolite, i.e., the NU-88 zeolite, with the gel of the oxide selected as the matrix.

The hydrogenating function can be introduced by one or more ion exchange operations carried out on the calcined support constituted by a NU-88 zeolite dispersed in the selected matrix, using solutions containing precursor salts of the selected metals.

The hydrogenating function can be introduced by one or more steps for impregnating the formed and calcined support using a solution containing at least one precursor of at least one oxide of at least one metal selected from the group formed by metals from group VIII and group VIB, the precursor(s) of at least one oxide of at least one group VIII metal preferably being introduced after those of group VIB or at the same time as the latter, if the catalysts contain at least one group VIB metal and at least one group VIII metal.

When the catalyst contains at least one group VIB element, for example molybdenum, it is possible to impregnate the catalyst with a solution containing at least one group VIB element, then drying and calcining. The molybdenum can be impregnated more easily by adding phosphoric acid to solutions of ammonium paramolybdate, which can also introduce phosphorous to promote the catalytic activity.

In a preferred implementation of the invention, the catalyst contains, as a promoter, at least one element selected from silicon, boron and phosphorous. These elements are introduced onto a support already containing at least one NU-88 zeolite, at least one matrix as defined above, and at least one metal selected from the group formed by group VIB and group VIII metals.

When the catalyst contains boron, silicon and phosphorous and optionally element selected from group VIIA halide ions and optionally at least one element selected from group VIIB, these elements can be introduced into the catalyst at various stages of the preparation and in a variety of manners.

The matrix is preferably impregnated using the "dry" impregnation method which is well known to the skilled person. impregnation can be carried out in a single step using a solution containing all of the constituent elements of the final catalyst.

P, B, Si and the element selected from the group VIIA halide ions can be introduced onto the calcined precursor in one or more impregnation operations using an excess of solution.

When the catalyst contains boron, a preferred method of the invention consists of preparing an aqueous solution of at least one boron salt such as ammonium biborate or ammonium pentaborate in an alkaline medium and in the presence of hydrogen peroxide and carrying out dry impregnation, in which the pore volume of the precursor is filled with the boron-containing solution.

When the catalyst contains silicon, a solution of a silicone type silicon compound is used.

When the catalyst contains boron and silicon, the boron and silicon can also be deposited simultaneously using a solution containing a boron salt and a silicone type silicon compound. Thus, in the case where the precursor is a nickel-molybdenum type catalyst supported on a support containing NU-88 and alumina, for example, it is possible to impregnate this precursor with an aqueous solution of ammonium biborate or Rhodorsil E1P silicone from Rhône Poulenc, drying at 80° C., for example, impregnating with an ammonium fluoride solution, then drying at 80° C. for example, then calcining, for example and preferably in air in a traversed bed, for example at 500° C. for 4 hours.

When the catalyst contains at least one group VIIA element, preferably fluorine, it is possible to impregnate the catalyst with an ammonium fluoride solution, dry at 80° C., for example, then calcine, for example and preferably in air and in a traversed bed, for example at 500° C. for 4 hours.

Other impregnation sequences can be carried out to obtain the catalyst of the present invention.

When the catalyst contains phosphorous, the catalyst can, for example, be impregnated with a solution containing phosphorous, dried then calcined.

When the elements contained in the catalyst, i.e., at least one metal selected from the group formed by group VIII and group VIB metals, optionally boron, silicon. phosphorous, and at least one group VIIA element, at least one group VIIB element, are introduced in a plurality of impregnation steps using the corresponding precursor salts, an intermediate catalyst drying step is generally carried out at a temperature generally in the range 60° C. to 250° C. and an intermediate catalyst calcining step is generally carried out at a temperature in the range 250° C. to 600° C.

Preparation of the catalyst is completed by leaving the moist solid in a moist atmosphere at a temperature in the range 10° C. to 80° C., then drying the moist solid obtained at a temperature in the range 60° C. to 150° C., and finally calcining, the solid obtained at a temperature in the range 150° C. to 800° C.

Sources of group VIB elements which can be used are well known to the skilled person. Examples of molybdenum and tungsten sources are oxides and hydroxides, molybdic acids and tungstic acids and their salts, in particular ammonium salts such as ammonium molybdate ammonium heptamolybdate, ammonium tungstate, phosphomolybdic acid, phosphotungstic acid and their salts, silicomolybdic acid, silicotungstic acid and their salts. Preferably, oxides and ammonium salts are used, such as ammonium molybdate, ammonium heptamolybdate and ammonium tungstate.

The sources of the group VIII elements which can be used are well known to the skilled person. Examples of sources of non noble metals are nitrates, sulphates, phosphates, halides, for example chlorides, bromides and fluorides, and carboxylates, for example acetates and carbonates. Examples of sources of noble metals are halides, for example chlorides, nitrates, acids such as chloroplatinic acid, and oxychloride such as ammoniacal ruthenium oxychloride.

The preferred phosphorous source is orthophosphoric acid $H_3PO_4$, but its salts and esters such as ammonium phosphates are also suitable. Phosphorous can, for example, be introduced in the form of a mixture of, phosphoric acid and a basic organic Compound containing nitrogen, such as ammonia, primary and secondary amines, cyclic amines, pyridine group compounds, quinolines, and pyrrole group compounds.

A variety of silicon sources can be used. Examples are ethyl orthosilicate $Si(OEt)_4$, siloxanes, polysiloxanes, and halogenated silicates such as ammonium fluorosilicate $(NH_4)_2SiF_6$ or sodium fluorosilicate $Na_2SiF_6$. Silicomolybdic acid and its salts, and silicotungstic acid and its salts can also advantageously be used. Silicon can be added, for example, by impregnating ethyl silicate in solution in a water/alcohol mixture. Silicon can also be added, for example, by impregnation using a silicone type silicon compound suspended in water.

The boron source can be boric acid, preferably orthoboric acid $H_3BO_3$, ammonium biborate or pentaborate, boron oxide, or boric esters. Boron can, for example, be introduced in the form of a mixture of boric acid, hydrogen peroxide and a basic organic compound containing nitrogen, such as ammonia, primary and secondary amines, cyclic amines, pyridine group compounds, quinolines, and pyrrole group compounds. Boron can, for example, be introduced using a solution of boric acid in a water/alcohol mixture.

Sources of group VIIA elements which can be used are well known to the skilled person. As an example, fluoride anions can be introduced in the form of hydrofluoric acid or its salts. These salts are formed with alkali metals, ammonium or an organic compound. In the latter case, the salt is advantageously formed in the reaction mixture by reacting the organic compound with hydrofluoric acid. It is also possible to use hydrolysable compounds which can liberate fluoride anions in water, such as ammonium fluorosilicate $(NH_4)_2SiF_6$, silicon tetrafluoride $SiF_4$ or sodium $Na_2SiF_6$. Fluorine can be introduced, for example, by impregnating an aqueous hydrofluoride solution or ammonium fluoride.

Sources of group VIIB elements which can be used are well known to the skilled person. Ammonium salts, nitrates and chlorides are preferably used.

The catalysts obtained, in the form of oxides, can optionally be at least partially brought into the metal or sulphide form.

The catalysts obtained in the present invention are formed into grains of different shapes and dimensions. They are generally used in the form of cylindrical or polylobed extrudates such as bilobes, trilobes, or polylobes with a straight or twisted shape, but they can also be produced and used in the form of compressed powder, tablets, rings, beads or wheels. The specific surface area is measured by nitrogen adsorption using the BET method (Brunauer, Emmett, Teller, J. Am. Chem. Soc., vol. 60, 309–316 (1938)) and is in the range 50 to 600 $m^2/g$, the pore volume measured using a mercury porisimeter is in the range 0.2 to 1.5 $cm^3/g$ and the pore size distribution may be unimodal, bimodal or polymodal.

The catalysts obtained in the present invention are used for hydrocracking hydrocarbon feeds such as petroleum cuts. The feeds used in the process are gasolines, kerosines, gas oils, vacuum gas oils, atmospheric residues, vacuum residues, atmospheric distillates, vacuum distillates, heavy fuels, oils, waxes and paraffins, spent oil, deasphalted residues or crudes, feeds from thermal or catalytic conversion processes, and their mixtures. They contain heteroatoms such as sulphur, oxygen and nitrogen and possibly metals.

The catalysts obtained are advantageously used for hydrocracking, in particular of vacuum distillate type heavy hydrocarbons, deasphalted residues or hydrotreated residues or the like. The heavy cuts are preferably constituted by at least 80% by volume of compounds with a boiling point of at least 350° C., preferably in the range 350° C. to 580° C. (i.e., corresponding to compounds containing at least 15 to 20 carbon atoms). They generally contain heteroatoms such as sulphur and nitrogen. The nitrogen content is usually in the range 1 to 5000 ppm by weight and the sulphur content is in the range 0.01% to 5% by weight.

The hydrocracking conditions such as temperature, pressure, hydrogen recycle ratio, and hourly space velocity, can vary widely depending on the nature of the feed, the quality of the desired products and the facilities available to the refiner. The temperature is generally over 200° C. and usually in the range 250° C. to 480° C. The pressure is over 0.1 MPa and usually over 1 MPa. The hydrogen recycle ratio is a minimum of 50 and usually in the range 80 to 5000 normal liters of hydrogen per liter of feed. The hourly space velocity is generally in the range 0.1 to 20 volumes of feed per volume of catalyst per hour.

The catalysts of the present invention preferably undergo sulphurisation to transform at least part of the metallic species to the sulphide before bringing them into contact with the feed to be treated. This activation treatment by sulphurisation is well known to the skilled person and can be carried out using any method already described in the literature.

One conventional sulphurisation method which is well known to the skilled person consists of heating in the presence of hydrogen sulphide to a temperature in the range 150° C. to 800° C., preferably in the range 250° C. to 600° C., generally in a traversed bed reaction zone.

The catalyst of the present invention can advantageously be used for hydrocracking vacuum distillate type feeds with high sulphur and nitrogen contents.

In a first implementation, or partial hydrocracking, also known as mild hydrocracking, the degree of conversion is below 55%. The catalyst of the invention is thus used at a temperature which is generally 230° C. or more, preferably 300° C., generally over 480° C., and usually in the range 350° C. to 450° C. The pressure is generally over 2 MPa and preferably 3 MPa, less than 12 MPa and preferably less than 10 MPa. The quantity of hydrogen is a minimum of 100 normal liters of hydrogen per liter of feed and usually in the range 200 to 3000 normal liters of hydrogen per liter of feed. The hourly space velocity is generally in the range 0.1 to 10 $h^{-1}$. Under these conditions, the catalysts of the present invention have better activities for conversion, hydrodesulphuration and hydrodenitrogenation than commercially available catalysts.

In a second implementation, the process is carried out in two steps, the catalyst of the present invention advantageously being used under moderate hydrogen pressure conditions to crack cuts, for example vacuum distillates containing high sulphur and nitrogen contents which have already been hydrotreated. In this hydrocracking mode, the degree of conversion is below 55%. In this case, the petroleum cut is converted in two steps, the catalysts of the invention being used in the second step. The catalyst of the first step can be any prior art hydrotreated catalyst. This hydrotreatment catalyst advantageously comprises a matrix, preferably based on alumina and at least one metal with a hydrogenating function. The hydrotreatment function is ensured by at least one metal or metal compound, used alone or in combination, selected from group VIII and group VIB metals, such as nickel, cobalt, molybdenum or tungsten. Further, that catalyst can optionally contain phosphorous and optionally contain boron.

The first step is generally carried out at a temperature of 350–460° C., preferably 360–450° C.; a total pressure of at least 2 MPa, preferably 3 MPa, and an hourly space velocity of at least 100 Nl/Nl of feed, preferably 260–3000 Nl/Nl of feed.

In the conversion step using the catalyst of the invention (or second step), the temperatures are generally 230° C. or more and usually in the range 300° C. to 480° C., preferably in the range 330° C. to 450° C. The pressure is generally at least 2 MPa, preferably 3 MPa; it is less than 12 MPa and preferably less than 10 MPa. The quantity of hydrogen is a minimum of 100 l/l of feed and usually in the range 200 to 3000 l/l of hydrogen per liter of feed. The hourly space velocity is generally in the range 0.15 to 10 $h^{-1}$. Under these conditions, the catalysts of the present invention have better activities for conversion, hydrodesulphuration, hydrodenitrogenation and a better selectivity for middle distillates than commercially available catalysts. The service life of the catalysts is also improved in the moderate pressure range.

In a further two-step implementation, the catalyst of the present invention can be used for hydrocracking under high hydrogen pressure conditions of at least 5 MPa. The treated cuts are, for example, vacuum distillates containing high sulphur and nitrogen contents which have already been hydrotreated. In this hydrocracking mode, the degree of conversion is over 55%. In this case, the petroleum cut conversion process is carried out in two steps, the catalyst of the invention being used in the second step.

The catalyst of the first step can be any prior art hydrotreatment catalyst. This hydrotreatment catalyst advantageously comprises a matrix, preferably based on alumina and at least one metal with a hydrogenating function. The hydrotreatment function is ensured by at least one metal or metal compound, used alone or in combination, selected from group VIII and group VIB metals such as nickel, cobalt, molybdenum and tungsten. Further, this catalyst may optionally contain phosphorous and boron.

The first step is generally carried out at a temperature of 350–460° C., preferably 360–450° C., with a pressure of over 3 MPa, an hourly space velocity of 0.1–5 $h^{-1}$ preferably 0.2–2 $h^{-1}$ and with a quantity of hydrogen of at least 100 Nl/Nl of feed, preferably 260–3000 Nl/Nl of feed.

For the conversion step using the catalyst of the invention (or second step), the temperatures are generally 230° C. or more, usually in the range 300° C. to 480° C., preferably in the range 300° C. to 440° C. The pressure is generally over 5 MPa. preferably over 7 MPa. The quantity of hydrogen is a minimum of 100 l/l of feed, usually in the range 200 to 3000 l/l of hydrogen per liter of feed. The hourly space velocity is generally in the range 0.15 to 10 $h^{-1}$.

Under these conditions, the catalysts of the present invention have better activities for conversion and better selectivities for middle distillates than commercially available catalysts, even with considerably lower zeolite contents than those of commercially available catalysts.

The following examples illustrate the present invention without in any way limiting its scope.

EXAMPLES

Example 1

Preparation of a Hydrocracking Catalyst Support Containing a NU-88 Zeolite

NU-88 zeolite was synthesised from hexane-1,6-bis (methylpyrrolidinone) bromide (HexPyrr). The structure of hexane-1,6-bis (methylpyrrolidinone) bromide (HexPyrr) is as follows:

19/32

A reaction mixture with molar composition:

60 $SiO_2$: 2 $Al_2O_3$: 10 $Na_2O$; 10 HexPyrr: 3000 $H_2O$ was prepared from:

48.07 g of "CAB-O-SL" (BDH Ltd);

12.303 g of SoAl 235 solution (Laroche) (composition in weight %: 22.10% $Al_2O_3$; 20.40% $Na_2O$; 57.50% $H_2O$);

7.4 g of sodium hydroxide pellets;

57.2 g of HexPyrr (composition in weight %: 96.50% HexPyrr; 3.50% $H_2O$)

709 g of water.

The mixture was prepared using the following method:

A-solution of the sodium hydroxide and the sodium aluminate in water (approximately 200 g);

B-solution of the HexPyrr in water (approximately 150 g);

C-dispersion of the CAB-O-SIL in the remaining water.

Solution A was added to dispersion C with stirring; solution B was then added. Stirring, was continued until a homogeneous gel was obtained. The mixture obtained was then transferred to a stainless steel autoclave with a 1 liter capacity. The mixture was heated to a temperature of 160° C. This temperature was maintained during the entire reaction period. The mixture was stirred using an inclined paddle stirrer.

Samples of the reaction mixture were regularly removed and the progress of the reaction was followed by monitoring the pH. After 13 days at 160° C., the temperature of the reaction mixture was rapidly reduced to room temperature and the product was evacuated. The substance was then filtered; the solid product obtained was washed with demineralized water and dried for several hours at 100° C.

Analysis of the Si, Al and Na in the product was carried out using, atomic emission spectroscopy. The following molar composition was determined:

100 $SiO_2$; 4.82 $Al_2O_3$; 0.337 $Na_2O$.

The dried solid product was analysed by powder X ray diffraction and identified as NU-88 zeolite. The diagram obtained agreed with the results shown in Table 1. The diffractogram is shown in FIG. 1 [with the intensity I (arbitrary units) up the ordinate and 2θ(Cu K alpha) along the abscissa].

The product obtained above was calcined in nitrogen for 24 hours at 550° C.; this step was immediately followed by a second calcining step in air at 450° C., for 24 hours.

The substance obtained was then left in contact with an aqueous 1 mole solution of ammonium chloride for 2 hours at room temperature using 50 ml of solution per gram of calcined solid product. The substance was then filtered, washed with deionised water and dried at 110° C. This treatment was repeated three times. The substance was calcined in air for 24 hours at 550° C. The calcined product was analysed by X ray diffraction. The diffractogram obtained is shown in FIG. 2 [2θ(CuK alpha) along the abscissa and intensity I up the ordinate (arbitrary units)]. The X ray diffraction diagram was in agreement with Table 2.

Atomic emission spectroscopic analysis of the Si, Al and Na in the product gave the following molar composition:

100 $SiO_2$: 4.55 $Al_2O_3$: 0.009 $Na_2O$

A hydrocracking catalyst support containing NU-88 zeolite produced as above was obtained as follows. 19.4 g of NU-88 zeolite was mixed with 80.6 g of a matrix composed of ultrafine tabular boehmite or alumina gel sold by Condéa Chemie GmbH under the trade name GS3. This powder mixture was then mixed with an aqueous solution containing 66% nitric acid (7% by weight of acid per gram of dry gel) then mixed for 15 minutes. After mixing, the paste obtained was passed through a die with cylindrical orifices with a diameter of 1.4 mm. The extrudates were then dried overnight at 120° C. in air and calcined at 550° C. in air.

Example 2

Preparation of Hydrocracking Catalysts Containing a NU-88 Zeolite, in Accordance with the Invention Extrudates of the support containing a NU-88 zeolite of Example 1 were dry impregnated with an aqueous ammonium heptamolybdate solution, dried overnight at 120° C. in air and finally calcined in air at 550° C. The oxide weight contents of catalyst NU88Mo obtained are shown in Table 3.

Catalyst NU88Mo was then impregnated with an aqueous solution comprising ammonium biborate to deposit 1.6% by weight of $B_2O_3$. After ageing at room temperature in a water-saturated atmosphere, the impregnated extrudates were dried overnight at 120° C. then calcined at 550° C. for 2 hours in dry air. Catalyst NU88MoB was obtained. In the same way, catalyst NU88MoSi was obtained by impregnat ing catalyst NU88Mo with an emulsion of Rhodorsil EP1 silicone (Rhône Poulenc) emulsion to deposit 2.0% of $SiO_2$. The impregnated extrudates were then dried overnight at 120° C. and calcined for 2 hours at 550° C. in dry air. Finally, catalyst NU88MoBSi was obtained by impregnating catalyst NU88Mo with an aqueous solution comprising ammonium biborate and Rhodorsil EP1 (Rhône Poulenc) emulsion. The impregnated extrudates were then dried overnight at 120° C. and calcined for 2 hours at 550° C. in dry air.

Extrudates of the support containing a NU-88 zeolite prepared in Example 1 were dry impregnated with an aqueous solution of ammonium heptamolybdate and nickel nitrate, dried overnight at 120° C. and finally calcined at 550° C. in air. The oxide weight contents of catalyst NU88NiMo obtained are shown in Table 3.

The extrudates were dry impregnated with an aqueous solution of ammonium heptamolybdate, nickel nitrate and orthophosphoric acid, dried overnight at 120° C. and finally calcined at 550° C. in air. The oxide weight contents of catalyst NU88NiMoP obtained are shown in Table 3.

We then impregnated a sample of catalyst NU88NiMoP with an aqueous solution comprising ammonium biborate. After ageing at room temperature in a water-saturated atmosphere, the impregnated extrudates were dried overnight at 120° C. and finally calcined for 2 hours at 550° C. in dry air. Catalyst NU88NiMoPB was obtained.

A catalyst NU88NiMoPSi was obtained using the same procedure as that for NU88NiMoPB described above, replacing the boron precursor in the inmpregnation solution with a Rhodorsil EP1 silicone emulsion.

Finally, catalyst NU88NiMoPBSi was obtained using the same procedure as that for the catalysts above but using an aqueous solution comprising ammonium biborate and Rhodorsil EP1 silicone emulsion. Fluorine was then added to this catalyst by impregnation using a dilute solution of hydrofluoric acid so as to deposit about 1% by weight of fluorine. After drying overnight at 120° C. and calcining at 550° C. for 2 hours in dry air, catalyst NU88NiMoPBSiF was obtained. The final oxide contents of the NU88NiMo catalysts are shown in Table 3.

TABLE 3

Characteristics of catalysts NU88Mo and NU88NiMo

| Catalyst | NU88Mo | NU88MoB | NU88MoSi | NU88MoBSi |
|---|---|---|---|---|
| $MoO_3$ (wt %) | 14.6 | 14.4 | 14.3 | 14.1 |
| $B_2O_3$ (wt %) | 0 | 1.4 | 0 | 1.33 |
| $SiO_2$ (wt %) | 15.2 | 15.0 | 16.9 | 16.6 |
| Complement to 100% mainly composed of $Al_2O_3$ (wt %) | 70.2 | 69.3 | 68.8 | 68.0 |

| Catalyst | NU88 NiMo | NU88 NiMoP | NU88 NiMoPB | NU88 NiMoPSi | NU88 NiMoPBSi | NU88 NiMoPBSiF |
|---|---|---|---|---|---|---|
| $MoO_3$ (wt %) | 13.8 | 13.3 | 13.0 | 13.0 | 12.8 | 12.7 |
| NiO (wt %) | 3.1 | 3.0 | 2.95 | 2.95 | 2.9 | 2.9 |
| $P_2O_5$ (wt %) | 0 | 4.65 | 4.6 | 4.6 | 4.5 | 4.4 |
| $B_2O_3$ (wt %) | 0 | 0 | 1.6 | 0 | 1.5 | 1.5 |
| $SiO_2$ (wt %) | 14.8 | 14.1 | 13.8 | 15.6 | 15.3 | 15.2 |
| F (wt %) | 0 | 0 | 0 | 0 | 0 | 1.05 |
| Complement to 100% mainly composed of $Al_2O_3$ (wt %) | 68.3 | 64.95 | 64.05 | 63.85 | 63.0 | 62.2 |

Catalyst NU88NiMoP was then impregnated with an aqueous solution comprising manganese nitrate. After ageing at room temperature in a water-saturated atmosphere, the impregnated extrudates were dried overnight at 120° C. then calcined at 550° C. for hours in dry air. Catalyst NU88NiMoPMn was obtained. This catalyst was then impregnated with an aqueous solution containing ammonium biborate and a Rhodorsil EP1 (Rhône Poulenc) silicone emulsion. The impregnated extrudates were then dried overnight at 120° C. and calcined at 550° C. for 2 hours in dry air and catalyst NU88NiMoPMnBSi was obtained. Fluorine was then added to this catalyst by impregnating with a dilute hydrofluoric acid solution so as to deposit about 1% by weight of fluorine. After drying overnight at 120° C. and calcining at 550° C. for 2 hours in dry air, catalyst NU88NiMoPMnBSiF was obtained. The weight contents of these catalysts are shown in Table 3bis.

TABLE 3BIS

Characteristics of NU88NiMo catalysts containing manganese

| Catalyst | NU88 NiMoPMn | NU88 NiMoPMnBSi | NU88 NiMoPMnBSiF |
|---|---|---|---|
| $MoO_3$ (wt %) | 12.9 | 12.5 | 12.4 |
| NiO (wt %) | 2.9 | 2.8 | 2.8 |
| $MnO_2$ (wt %) | 2.1 | 2.0 | 2.0 |
| $P_2O_5$ (wt %) | 4.8 | 4.6 | 4.5 |

TABLE 3BIS-continued

Characteristics of NU88NiMo catalysts containing manganese

| Catalyst | NU88 NiMoPMn | NU88 NiMoPMnBSi | NU88 NiMoPMnBSiF |
|---|---|---|---|
| $B_2O_3$ (wt %) | 0 | 1.4 | 1.4 |
| $SiO_2$ (wt %) | 13.7 | 15.3 | 15.1 |
| F (wt %) | 0 | 0 | 1.0 |
| Complement to 100% mainly composed of $Al_2O_3$ (wt %) | 63.6 | 61.4 | 60.8 |

Electronic microprobe analysis of catalysts NU88NiMoPSi, NU88NiMoPBSi, NU88NiMoPBSiF (Table 3) and catalysts NU88NiMoPMnBSi, NU88NiMoPMnBSiF (Table 3bis) showed that the silicon added to the catalyst of the invention was mainly located on the matrix and was in the form of amorphous silica.

Example 3

Preparation of a Support Containing a NU-88 Zeolite and a Silica-alumina

We produced a silica-alumina powder by co-precipitation with a composition of 2% $SiO_2$ and 98% $Al_2O_3$. A support for a hydrocracking catalyst containing this silica-alumina and the NU-88 zeolite of Example 1 was then produced. To this end, 20.4% by weight of the NU-88 zeolite of Example 1 was mixed with 79.6% by weight of a matrix composed of the silica-alumina as prepared above. This powder mixture was mixed with an aqueous solution containing 66% nitric acid (7% by weight of acid per gram of dry gel) then mixed for 15 minutes. After mixing, the paste obtained was passed through a die having cylindrical orifices with a diameter of 1.4 mm. The extrudates were then dried overnight at 120° C. and calcined at 550° C. for 2 hours in air.

Example 4

Preparation of Hydrocracking Catalysts Containing a NU-88 Zeolite and a Silica-alumina Support extrudates containing a silica-alumina and a NU-88 zeolite from Example 3 were dry impregnated using an aqueous solution of a mixture of ammonium heptamolybdate, nickel nitrate and orthophosphoric acid, dried overnight at 120° C. in air and finally calcined in air at 550° C. The oxide weight contents of catalyst NU88-SiAl-NiMoP obtained are shown in Table 4.

We impregnated the NU88-SiAl-NiMoP catalyst sample with an aqueous solution comprising ammonium biborate to impregnate 1.5% by weight of $B_2O_3$. After ageing at room temperature in a water-saturated atmosphere, the impregnated extrudates were dried overnight at 120° C. and calcined in dry air for 2 hours at 550° C. Catalyst NU88-SiAl-NiMoPB was obtained which thus contained silicon in its silica-alumina matrix.

The characteristics of the NU88-SiAl-NiMo catalysts are summarised in Table 4.

TABLE 4

Characteristics of NU88-SiAl-NiMo catalysts

| Catalyst | NU88-SiAl-NiMoP | NU88-SiAl-NiMoPB |
|---|---|---|
| $MoO_3$ (wt %) | 13.2 | 13.0 |
| NiO (wt %) | 2.9 | 2.8 |
| $P_2O_5$ (wt %) | 4.8 | 4.7 |
| $B_2O_3$ (wt %) | 0 | 1.4 |
| $SiO_2$ (wt %) | 16.0 | 15.8 |
| Complement to 100% mainly composed of $Al_2O_3$ (wt %) | 63.1 | 62.9 |

Example 5

Preparation of a Support Containing a Y Zeolite

A large quantity of a hydrocracking catalyst support containing a Y zeolite was produced so as to enable different catalysts based on that support to be prepared. To this end, 20.5% by weight of a delaminated Y zeolite with a lattice parameter of 2.429 nm, a global $SiO_2/Al_2O_3$ ratio of 30.4 and a framework $SiO_2/Al_2O_3$ ratio of 58 was mixed with 79.5% by weight of a matrix composed of ultrafine tabular boehmite or alumina gel sold by Condéa Chemie GmbH under the trade name GS3. This powder mixture was then mixed with an aqueous solution containing 66% nitric acid (7% by weight of nitric acid per gram of dry gel) then mixed for 15 minutes. After mixing, the paste obtained was passed through a die having cylindrical orifices with a diameter of 1.4 mm. The extrudates were then dried overnight at 120° C. and calcined in air for 2 hours at 550° C. in moist air containing 7.5% by volume of water. Cylindrical extrudates 1.2 mm in diameter were produced which had a specific surface area of 223 $m^2/g$ and a monomodal pore size distribution centred on 10 nm. Analysis of the matrix by X ray diffraction showed that it was composed of low crystallinity cubic gamma alumina and dealuminated Y zeolite.

Example 6

Preparation of Hydrocracking Catalysts Containing a Y Zeolite (not in accordance with the invention)

Support extrudates containing a dealuminated Y zeolite from Example 5 were dry impregnated using an aqueous solution of a mixture of ammonium heptamolybdate, nickel nitrate and orthophosphoric acid, dried overnight at 120° C. and finally calcined in air at 550° C. The oxide weight contents of catalyst YNiMoP obtained are shown in Table 5. The final YNiMoP catalyst contained 16.3% by weight of Y zeolite with a lattice parameter of 2.429 nm, a global $SiO_2/Al_2O_3$ ratio of 30.4 and a framework $SiO_2/Al_2O_3$ ratio of 58.

We impregnated the YNiMoP catalyst sample with an aqueous solution comprising ammonium biborate. After ageing at room temperature in a water-saturated atmosphere, the impregnated extrudates were dried overnight at 120° C. and calcined in dry air for 2 hours at 550° C. A boron-doped NiMoP/Y-alumina catalyst was obtained.

A YNiMoPSi catalyst was obtained using the same procedure as the YNiMoPB catalyst described above, replacing the boron precursor in the impregnation solution with Rhodorsil EP1 (Rhône Poulenc) emulsion.

Finally, a YNiMoPBSi catalyst was obtained by impregnating the catalyst with an aqueous solution comprising ammonium biborate and Rhodorsil EP1 (Rhône Poulenc) emulsion. The other steps of the procedure were the same as indicated above. The characteristics of the YNiMo catalysts are summarised in Table 5.

TABLE 5

Characteristics of YNiMo catalysts

| Catalyst | YNiMo | YNiMoP | YNiMoPB | YNiMoPSi | YNiMoPBSi |
|---|---|---|---|---|---|
| $MoO_3$ (wt %) | 13.5 | 12.9 | 12.7 | 12.7 | 12.5 |
| NiO (wt %) | 3.1 | 3.0 | 2.9 | 2.9 | 2.8 |
| $P_2O_5$ (wt %) | 0 | 4.4 | 4.3 | 4.3 | 4.2 |
| $B_2O_3$ (wt %) | 0 | 0 | 1.8 | 0 | 1.8 |
| $SiO_2$ (wt %) | 16.2 | 15.4 | 15.2 | 17.0 | 16.7 |
| Complement to 100% mainly composed of $Al_2O_3$ (wt %) | 67.2 | 64.3 | 63.1 | 63.1 | 62.0 |

Electronic microprobe analysis of YNiMoPSi and YNiMoPBSi catalysts (Table 5) showed that the silica added to the catalyst of the invention was principally located on the matrix and was in the form of amorphous silica.

Example 7
Comparison of Catalysts for Hydrocracking a Vacuum Gas Oil in Partial Conversion The catalysts prepared in the above examples were employed under moderate pressure hydrocracking conditions using a petroleum feed with the following principal characteristics:

| Density (20/4) | 0.921 |
|---|---|
| Sulphur (weight %) | 2.46 |
| Nitrogen (ppm by weight) | 1130 |
| Simulated distillation | |
| Initial point | 365° C. |
| 10% point | 430° C. |
| 50% point | 472° C. |
| 90% point | 504° C. |
| End point | 539° C. |
| Pour point | +39° C. |

The catalytic test unit comprised two fixed bed reactors in upflow mode. Catalyst HTH548 from Procatalyse for the first hydrotreatment step of the process, comprising a group VI element and a group VIII element deposited on alumina, was introduced into the first reactor, through which the feed passed first. A hydrocracking catalyst as described above was introduced into the second reactor, through which the feed passed last. 40 ml of catalyst was introduced into each of the reactors. The two reactors operated at the same temperature and the same pressure. The operating conditions of the test unit were as follows:

| Total pressure | 5 MPa |
|---|---|
| Hydrotreatment catalyst | 40 $cm^3$ |
| Hydrocracking catalyst | 40 $cm^3$ |
| Temperature | 400° C. |
| Hydrogen flow rate | 20 l/h |
| Feed flow rate | 40 $cm^3$/h |

The two catalysts underwent in-situ sulphurisation before the reaction. It should be noted that any in-situ or ex-situ sulphurisation method is suitable. Once sulphurisation had been carried out, the feed described above could be transformed.

The catalytic performances are expressed as the gross conversion at 400° C. (GC), the gross selectivity for middle distillates (GS) and the hydrodesulphuration (HDS) and hydrodenitrogenation (HDN) conversions. These catalytic performances were measured for the catalyst after a stabilisation period, generally ot at least 48 hours, had passed.

The gross conversion GC is taken to be:

GC=weight % of 380° $C.^{minus}$ of effluent.

380° $C.^{minus}$ represents the fraction distilled at a temperature of 380° C. or less.

The gross selectivity GS for middle distillates is taken to be:

GS=100*weight of (150° C.–380° C.) fraction/weight of 380° $C.^{minus}$ fraction of effluent.

The hydrodesulphuration conversion HDS is taken to be:

$$HDS=(S_{initial}-S_{effluent})/S_{initial}*100=(24600-S_{effluent})24600*100$$

The hydrodenitrogenation conversion HDN is taken to be:

$$HDN=(N_{initial}-N_{effluent})/N_{initial}*100=(130-N_{effluent})/1130*100$$

The following table shows the gross conversion GC. at 400° C., the gross selectivity GS, the hydrodesulphuration conversion HDS and the hydrodenitrogenation conversion HDN for the catalysts.

TABLE 6

Catalytic activities of catalysts for partial hydrocracking at 400° C.

| | | GC (wt %) | GS (%) | HDS (%) | HDN (%) |
|---|---|---|---|---|---|
| YNiMoP | NiMoP/Y | 48.7 | 80.3 | 99.43 | 96.6 |
| YNiMoPB | NiMoPB/Y | 49.3 | 80.4 | 99.57 | 97.4 |
| YNiMoPSi | NiMoPSi/Y | 49.5 | 78.9 | 99.85 | 98.3 |
| NU88-SiAl-NiMoP | NiMoP/NU88-SiAl | 49.9 | 59.1 | 98.5 | 96.5 |
| NU88-SiAl-NiMoPB | NiMoPB/NU88-SiAl | 50.3 | 58.6 | 98.4 | 97.3 |
| NU88NiMo | NiMo/NU-88 | 49.7 | 59.2 | 98.7 | 95.1 |
| NU88NiMoP | NiMoP/NU-88 | 49.7 | 60.3 | 99.3 | 96.2 |
| NU88NiMoPB | NiMoPB/NU-88 | 50.1 | 60.4 | 99.4 | 97.3 |
| NU88NiMoPSi | NiMoPSi/NU-88 | 50.4 | 59.3 | 99.4 | 98.0 |
| NU88NiMoPBSi | NiMoPBSi/NU-88 | 50.9 | 59.4 | 99.5 | 98.4 |

The results of Table 6 show that a catalyst of the invention containing a NU-88 zeolitic is more active than the prior art catalysts and further, adding at least one element selected from the group formed by B, Si and P improves the performances of the catalyst as regards conversion. The gross selectivity for middle distillates reduced because of the increase in the conversion, as is well known. The catalysts of the invention containing boron and silicon are thus of particular interest for partial hydrocracking of a vacuum distillate type feed containing nitrogen at medium hydrogen pressure.

Further, the results of Table 6 show that is advantageous to introduce silica into the prepared catalyst (NU88NiMo series) rather than in the form of a support containing silicon obtained from a silica-alumina (NU88-SiAl-NiMo series). It is thus of particular advantage to introduce the silicon to a precursor already containing the group VIB and/or VIII elements and optionally at least one of elements P, B and F.

Example 8

Comparison of Catalysts for Hydrocracking a Vacuum Gas Oil in High Conversion

The catalysts prepared in the above examples were used under high conversion (60–100%) hydrocracking conditions. The petroleum feed was a hydrotreated vacuum distillate with the following principal characteristics:

| | |
|---|---|
| Density (20/4) | 0.869 |
| Sulphur (ppm by weight) | 502 |
| Nitrogen (ppm by weight) | 10 |
| Simulated distillation | |
| Initial point | 298° C. |
| 10% point | 369° C. |
| 50% point | 427° C. |
| 90% point | 481° C. |
| End point | 538° C. |

This feed had been obtained by hydrotreatment of a vacuum distillate using a HR360 catalyst from Procatalyse comprising a group VIB element and a group VIII element deposited on alumina.

0.6% by weight of aniline and 2% by weight of dimethyldisulphide were added to the feed to simulate the partial pressures of $H_2S$ and $NH_3$ present in the second hydrocracking step. The prepared feed was injected into the hydrocracking test unit which comprised one fixed bed reactor in upflow mode, into which 80 ml of catalyst had been introduced. The catalyst was sulphurised using a n-hexane/DMDS+aniline mixture at 320° C. It should be noted that any in-situ or ex-situ sulphurisation method is suitable. Once sulphurisation had been carried out, the feed described above could be transformed. The operating conditions of the test unit were as follows:

| | |
|---|---|
| Total pressure | 9 MPa |
| Catalyst | 80 cm$^3$ |
| Temperature | 360–420° C. |
| Hydrogen flow rate | 80 l/h |
| Feed flow rate | 80 cm$^3$/h |

The catalytic performances are expressed as the temperature at which a cross conversion of 70% is produced and by the gross selectivity for 150–380° C. middle distillates. These catalytic performances were measured for the catalyst after a stabilisation period, generally of at least 48 hours, had passed.

The gross conversion GC is taken to be:

GC=weight % of 380° C.$^{minus}$ of effluent.

The gross selectivity GS for middle distillates is taken to be:

GS=100*weight of (150° C.–380° C.) fraction/weight of 380° C.$^{minus}$ fraction of effluent.

The (27–150) gasoline yield (hereinafter Gyld) was equal to the weight % of compounds with a boiling point in the range 27° C. to 150° C. in the effluents. The jet fuel yield (kerosine, 150–250) (hereinafter Kyld) was equal to the weight % of compounds with a boiling point in the range 150° C. to 250° C. in the effluents. The (250–380) gas oil yield was equal to weight % of compounds with a boiling points in the range 250° C. to 380° C. in the effluents.

The reaction temperature was fixed so as to obtain a gross conversion GC of 70% by weight. Table 7 below shows the reaction temperature and gross selectivity for the catalysts described in Tables 3 and 3bis.

TABLE 7

Catalytic activities of catalysts for high conversion (70%) hydrocracking

| | | T (° C.) | Gasoline yield (wt %) | Kerosine yield (wt %) |
|---|---|---|---|---|
| YNiMo | NiMo/Y | 375 | 20.5 | 24.1 |
| YNiMoP | NiMoP/Y | 374 | 21.2 | 24.7 |
| YNiMoPB | NiMoPB/Y | 374 | 20.7 | 23.6 |
| YNiMoPSi | NiMoPSi/Y | 374 | 19.9 | 23.1 |
| NU88Mo | Mo/NU-88 | 373 | 36.5 | 12.4 |
| NU88MoB | MoB/NU-88 | 373 | 36.4 | 12.1 |
| NU88MoSi | MoSi/NU-88 | 372 | 36.1 | 12.0 |

TABLE 7-continued

Catalytic activities of catalysts for high conversion (70%) hydrocracking

| | | T (° C.) | Gasoline yield (wt %) | Kerosine yield (wt %) |
|---|---|---|---|---|
| NU88MoBSi | MoBSi/NU-88 | 371 | 35.3 | 12.1 |
| NU88NiMo | NiMo/NU-88 | 373 | 37.4 | 12.0 |
| NU88NiMoP | NiMoP/NU-88 | 373 | 37.4 | 12.9 |
| NU88NiMoPB | NiMoPB/NU-88 | 371 | 37.3 | 12.6 |
| NU88NiMoPSi | NiMoPSi/NU-88 | 371 | 37.9 | 12.9 |
| NU88NiMoPBSi | NiMoPBSi/NU-88 | 370 | 36.6 | 12.9 |
| NU88NiMoPBSiF | NoMoPBSiF/NU-88 | 367 | 36.4 | 13.2 |
| NU88NiMoPMn | NiMoPMn/NU-88 | 371 | 36.4 | 12.6 |
| NU88NiMoPMnBSi | NiMoPMnBSi/NU-88 | 368 | 35.9 | 12.7 |
| NU88NiMoPMnBSiF | NiMoPMnBSiF/NU-88 | 365 | 35.7 | 12.4 |

Table 7 shows that using a catalyst of the invention containing NU-88 zeolite leads to higher conversions (i.e., lower conversion temperatures for a given conversion of 70% by weight) than catalysts which are not in accordance with the invention. Further, adding at least one element selected from the group formed by P, B and Si to the catalysts of the invention also leads to an increase in activity. The improvement in activity provided by the presence of manganese or fluorine can also be seen. Further, all of the catalysts of the invention lead to gasoline and kerosine yields which are improved over those recorded for prior art catalysts.

In general, adding at least one element selected from the group formed by P, B, Si, VIIB, VIIA to a catalyst containing NU-88 zeolite and a group VIB element improves the conversion activity, leading to a reduction in the reaction temperature required to reach 70% conversion but tending to reduce the gross selectivity for gasoline and kerosine, in particular the gasoline selectivity, this always remaining substantially higher than that obtained with prior art catalysts based on Y zeolite.

What is claimed is:

1. A catalyst comprising at least one matrix, at least one group VIII or VIB metal a promoter which is phosphorous, boron or silicon, and at least one NU-88 zeolite, said zeolite having i) a chemical composition, expressed in terms of the mole ratios of the oxides for the anhydrous state, of the formula:

$$100XO_2, mY_2O_3, pR_{2/n}O$$

wherein
  m is 10 or less;
  p is 20 or less;
  R is one or more cations with valence n;
  X is silicon and/or germanium;
  Y is aluminum, iron, gallium, boron, titanium, vanadium, zirconium, molybdenum, arsenic, antimony, chromium or manganese; and ii) an X ray diffraction diagram, in as synthesized state, which comprises the results shown in Table 1:

TABLE 1

X ray diffraction diagram for NU-88 zeolite (as synthesized state)

| $d_{hkl}$ ($10^{-10}$ m) | $I/I_{max}$ |
|---|---|
| 12.1 ± 0.35 | s or vs (1) |
| 11.0 ± 0.30 | s (1) |
| 9.88 ± 0.25 | m (1) |
| 6.17 ± 0.15 | w |
| 3.97 ± 0.09 | vs (2) |
| 3.90 ± 0.08 | vs (2) |
| 3.80 ± 0.08 | w (2) |
| 3.66 ± 0.07 | vw |
| 3.52 ± 0.07 | vw |
| 3.27 ± 0.07 | vw |
| 3.09 ± 0.06 | w |
| 2.91 ± 0.06 | w |
| 2.68 ± 0.06 | vw |
| 2.49 ± 0.05 | vw |
| 2.20 ± 0.05 | vw |
| 2.059 ± 0.05 | w |
| 1.729 ± 0.04 | vw |

(1) these peaks were not resolved and formed part of a feature;
(2) these peaks were not resolved and formed part of the same feature.

2. A catalyst according to claim 1, in which the value m for the zeolite is in the range 0.1 to 10.

3. A catalyst according to claim 1, in which the zeolite has the following chemical composition, expressed in terms of the mole ratios of the oxides for the anhydrous state:

$$100XO_2, 10 \text{ or less } Y_2O_3, 10 \text{ or less } Q, 10 \text{ or less } M_2O;$$

wherein
  X is silicon and/or germanium;
  Y is aluminum, iron, gallium, boron, titanium, vanadium, zirconium, molybdenum, arsenic, antimony, chromium or manganese; and
  M is at least one cation of an alkali metal and/or ammonium and/or hydrogen; and
  Q is at lest one nitrogen-containing organic cation, a precursor of a nitrogen-containing organic cation or a decomposition product of a nitrogen-containing organic cation.

4. A catalyst according to claim 1, in which in the zeolite X is silicon and Y is aluminum.

5. A catalyst according to claim 1, in which the zeolite is at least partially the H+ or NH4+ form or metal form, said metal being of group IA, IB, IIA, IIB, IIIA, IIIB, a rare earth, group VIII, Sn, Pb or Si.

6. A catalyst according to claim 1, further comprising at least one group VIIA metal.

7. A catalyst according to claim 1, further comprising at least one group VIIB metal.

8. A catalyst according to claim 1, comprising, with respect to the weight of the catalyst:
- 0.1% to 60% of at least one group VIII or group VIIB metal;
- 0.1% to 99% of at least one amorphous or low crystallinity porous mineral oxide matrix;
- 0.1% to 99.8% of NU-88 zeolite;
- up to 20% of at least one promoter element which is silicon, boron or phosphorous;
- 0 to 20% of at least one group VIIA element;
- 0 to 20% of at least one group VIIB element.

9. A process for preparing a catalyst according to claim 1, in which at least one group VIII or VIB metal is introduced into a mixture of at least one matrix and the NU-88 zeolite, before or after forming said mixture.

10. A process for preparing a catalyst according to claim 9, further comprising impregnating with at least one solution containing at least one of boron, silicon or phosphorous.

11. A process for preparing a catalyst according to claim 9, in which the catalyst is impregnated with at least one solution of at least one group VIIA element.

12. A process for preparing a catalyst according to claim 9, in which the catalyst is impregnated with at least one solution of at least one group VIIB element.

13. A process for preparing a catalyst according to claim 9, comprising exposing a solid to a moist atmosphere at a temperature of 10° C. to 80° C., and drying the moist solid obtained at a temperature of 60° C. to 150° C., and calcining at a temperature of 150° C. to 800° C.

14. A process for preparing a catalyst according to claim 9, comprising drying and calcining between each impregnation of an element contained in the catalyst.

15. A process for hydrocracking a hydrocarbon feed, comprising subjecting said feed to hydrocracking conditions, in the presence of a catalyst according to claim 1.

16. A process according to claim 15, wherein the catalyst has been subjected to a sulphurization treatment.

17. A process according to claim 15, wherein the feed comprises at least 80% by volume of compounds with a boiling point of at least 350° C.

18. A process according to claim 15, conducted at a temperature over 200° C., a pressure over 0.1 MPa, a hydrogen recycle ratio of over 50 normal liters of hydrogen per liter of feed, and a HSV of 0.1 to 20 $h^{-1}$.

19. A process according to claim 15, comprising partial hydrocracking, with a degree of conversion of less than 55%.

20. A process according to claim 19, conducted at a temperature of 230° C. or more, a pressure 2 MPa up to 12 MPa, a quantity of hydrogen over 100 Nl/Nl of feed and an hourly space velocity of 0.15 to 10 $h^{-1}$.

21. A process according to claim 15, conducted at a pressure over 5 MPa and a degree of conversion over 55%.

22. A process according to claim 21, conducted at a temperature of at least 230° C. a pressure over 5 MPa and a quantity of hydrogen over 100 Nl/Nl of feed and an hourly space velocity of 0.15 to 10 $h^{-1}$.

23. A process according to claim 15, further comprising a prior hydrotreatment step carried out at a temperature of 350° C. to 460° C., a total pressure of at least 2 MPa, a quantity of hydrogen of at least 100 Nl/Nl of feed, and an hourly space velocity of 0.1 to 5 $h^{-1}$ said prior hydrotreatment step being carried out in the presence of a hydrotreatment catalyst.

24. A catalyst comprising at least one group VIII or group VIB metal, and at least one NU-88 zeolite having
   i) a chemical composition, expressed in terms of the mole ratios of the oxides for the anhydrous state, of the formula:

$100XO_2$, 10 or less $Y_2O_3$, 10 or less $M_2O$;

wherein
   X is silicon and/or germanium;
   Y is aluminum iron, gallium, boron, titanium, vanadium, zirconium, molybdenum, arsenic, antimony, chromium or manganese; and
   M is at lest one cation of an alkali metal and/or ammonium and/or hydrogen;
   ii) an X ray diffraction diagram, in as synthesized state, which comprises the results shown in Table 2:

TABLE 2

X ray diffraction diagram for NU-88 zeolite [(hydrogen form)] (as synthesized)

| $d_{hkl}$ ($10^{-10}$ m) | $I/I_{max}$ |
|---|---|
| 12.1 ± 0.35 | vs (1) |
| 11.0 ± 0.30 | s or vs (1) |
| 9.92 ± 0.25 | w or m (1) |
| 8.83 ± 0.20 | vw |
| 6.17 ± 0.15 | w |
| 3.99 ± 0.10 | s or vs (2) |
| 3.91 ± 0.08 | vs (2) |
| 3.79 ± 0.08 | w or m (2) |
| 3.67 ± 0.07 | vw |
| 3.52 ± 0.07 | vw |
| 3.09 ± 0.06 | w |
| 2.90 ± 0.06 | w |
| 2.48 ± 0.05 | w |
| 2.065 ± 0.05 | w |
| 1.885 ± 0.04 | vw |
| 1.733 ± 0.04 | vw |

(1) these peaks were not resolved and formed part of a feature;
(2) these peaks were not resolved and formed part of the same feature.

* * * * *